(12) United States Patent
Suzuki et al.

(10) Patent No.: US 6,825,999 B2
(45) Date of Patent: Nov. 30, 2004

(54) LENS DRIVING APPARATUS AND COIL SUBSTRATE THEREFOR

(75) Inventors: Jun Suzuki, Saitama (JP); Eiji Kuroki, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/445,302

(22) Filed: May 27, 2003

(65) Prior Publication Data

US 2004/0017621 A1 Jan. 29, 2004

(30) Foreign Application Priority Data

May 27, 2002 (JP) ........................................ 2002-152054

(51) Int. Cl.[7] ............................. G02B 7/02; G11B 7/00; G11B 17/30; G11B 17/00
(52) U.S. Cl. ....................... 359/824; 359/813; 359/814; 369/44.15; 369/215; 369/219; 369/221; 369/244
(58) Field of Search ................................. 359/813, 814, 359/823, 824; 369/44.14, 44.15, 44.16, 215, 219, 221, 244

(56) References Cited

U.S. PATENT DOCUMENTS 6,504,813 B2 * 1/2003 Suzuki et al. ............... 369/244
6,570,720 B2 * 5/2003 Kawano ...................... 359/813
6,587,284 B2 * 7/2003 Santo et al. ................. 359/824
6,625,105 B2 * 9/2003 Suzuki et al. ............... 369/244
2001/0026403 A1   10/2001 Suzuki et al.

FOREIGN PATENT DOCUMENTS

JP   2001-118265    4/2001
JP   2001-229557    8/2001

* cited by examiner

Primary Examiner—Loha Ben
(74) Attorney, Agent, or Firm—Sughrue Mion, PLLC

(57) ABSTRACT

A coil substrate used for a lens driving apparatus is provided in a drive device for an optical disc. The coil substrate includes a tracking coil and a pair of focus coils disposed on a substantially rectangular substrate. The pair of the focus coils is disposed on the both sides of the tracking coil in the direction of the longer side of the substrate. The tracking coil and the focus coils may be substantially aligned in the direction of the longer side of the substrate, or may have the substantially equal lengths in the direction of the shorter side of the substrate. Thereby, the lengths of the coils in the direction of shorter side of the coil substrate can be made smaller. Thus, the coil substrate and the magnet can be reduced in size, and the miniaturization of the entire lens driving apparatus can be achieved.

9 Claims, 8 Drawing Sheets

(b)

LENS DRIVING APPARATUS AND COIL SUBSTRATE THEREFOR

BACKGROUND OF THE INVENTION

1. Field of the Invention

The present invention relates to a lens driving apparatus for a disc player which records information on a disc and/or reads the recorded information from the disc. In particular, the present invention relates to the structure of a lens driving apparatus using a flat coil.

2. Description of Related Art

There is known a lens driving apparatus which drives an objective lens in an optical axis direction of the lens (i.e., focus direction) for converging a reading beam onto the disc surface, at the time of reading the information from a disc on which information is optically recorded, and drives the objective lens in the direction perpendicular to the optical axis of the lens (i.e., tracking direction) to enable the reading beam to follow the information track.

The Japanese Patent Application Laid-Open under (JP-A) No. 2001-229557 discloses an example of such a lens driving apparatus. The lens driving apparatus is of a print coil type, which includes flat coil substrates formed by patterning and etching a focus coil and tracking coils, fixed on the both side surfaces of a holder holding an objective lens by an adhesive or the like. In this kind of the lens driving apparatus, in order to arrange the focus coil and the tracking coils at appropriate positions with respect to the magnetization boundary line of a magnet magnetized substantially in a U shape, the focus coil and the tracking coils need to be formed displaced with each other on the coil substrate. In the above-mentioned example of the lens driving apparatus, the focus coil is disposed at a position above the tracking coil in the optical axis direction of the lens. Therefore, the coil substrate needs to have a certain length in the optical axis direction of the lens, and hence there is such a problem that the lens driving apparatus becomes large in size.

In contrast, the Japanese Patent Application Laid-Open under (JP-A) No. 2001-118265 discloses a lens driving apparatus of other type. In this lens driving apparatus, a coil functioning as both a focus coil and a tracking coil is formed on a coil substrate so that the width of the coil substrate in the up and down direction (i.e., the optical axis direction of the lens) is made smaller.

However, in this lens driving apparatus, since the coil serving as both the focus coil and the tracking coil is used, the polarity of the electric current supplied to the coil should be switched for the focus control and the tracking control, and there is such a problem that the control is complicated.

SUMMARY OF THE INVENTION

The present invention is achieved in order to solve the above problems. It is an object of this invention to provide a coil substrate for a lens driving apparatus capable of achieving miniaturization without the need of complicated control, such as the switching control of the current supply to the coil.

According to one aspect of the present invention, there is provided a coil substrate for a lens driving apparatus including: a substrate of substantially rectangular shape; a tracking coil disposed on the substrate; and a pair of focus coils disposed on both sides of the tracking coil in a direction of a longer side of the substrate.

The above coil substrate for a lens driving apparatus is used for a pickup of a driving unit of an optical disc or the like, and includes a tracking coil and a pair of focus coils disposed on a substantially rectangular substrate. The pair of the focus coils is disposed on the both sides of the tracking coil in the direction of the longer side of the substrate. Thereby, the length in the direction of the shorter side of the substrate can be made smaller, and the coil substrate can be reduced in size.

In a preferred feature of the above coil substrate for a lens driving apparatus, the tracking coil and the focus coils may be substantially aligned in the direction of the longer side of the substrate. In another preferred feature of the above coil substrate for a lens driving apparatus, the tracking coil and the focus coils may have a substantially equal length in a direction of a shorter side of the substrate. Thus, the length in the direction of the shorter side of the coil substrate can further be reduced.

According to another aspect of the present invention, there is provided a lens driving apparatus including: a base; a magnet fixed on the base; a lens holder supported in a state movable in a focus direction and a tracking direction in a vicinity of the magnet; and a coil substrate mounted on the lens holder, wherein the coil substrate includes: a tracking coil disposed on the substrate, and a pair of focus coils disposed on the substrate on both sides of the tracking coil in a direction of a longer side of the substrate.

In the above lens driving apparatus, a magnet is fixed on a base, and a lens holder is supported movably in the vicinity thereof. Since the coil substrate is mounted on the lens holder, by supplying the current to the coil substrate within the magnetic field generated by the magnet, the lens holder is moved in the focus direction and the tracking direction. The coil substrate includes a tracking coil and a pair of focus coils on a substantially rectangular substrate. The pair of the focus coils is disposed on the both sides of the tracking coil in the direction of the longer side of the substrate. Accordingly, the length of the coil substrate in the direction of the shorter side of the substrate can be made smaller, and hence the lens driving apparatus itself can be made smaller.

In a preferred feature of the above lens driving apparatus, the tracking coil and the focus coils may be substantially aligned in the direction of the longer side of the substrate. In another preferred feature of the above lens driving apparatus, the tracking coil and the focus coils may have a substantially equal length in a direction of a shorter side of the substrate. Thus, the length in the direction of the shorter side of the coil substrate can further be reduced.

In another feature of the lens driving apparatus, the magnet may have a plurality of magnetization boundary lines formed by an S pole area and an N pole area adjacent with each other, and the magnetization boundary lines corresponding to the focus coils may be inclined with respect to the magnetization boundary line corresponding to the tracking coil. Thus, the magnet itself can be made smaller compared to the case of having the magnetization boundary lines corresponding to the focus coils and the magnetization boundary lines corresponding to the tracking coil orthogonal with each other.

In another feature of the lens driving apparatus, the magnet may have a plurality of magnetization boundary lines formed by an S pole area and an N pole area adjacent with each other, and the coil substrate may be disposed at such a position that each of the tracking coil and the focus coils straddles the corresponding magnetization boundary lines.

In a specific embodiment, the magnet may have three magnetization boundary lines formed by an S pole area and an N pole area adjacent with each other, and the three magnetization boundary lines may coincide with three straight lines formed by connecting a midpoint of one longer side of the magnet of rectangular shape with both ends and a midpoint of the other longer side of the magnet. In another embodiment, the magnet may have three magnetization boundary lines formed by an S pole area and an N pole area adjacent with each other, and the three magnetization boundary lines may coincide with three straight lines, the three straight lines including one straight line formed by connecting a midpoint of one longer side of the magnet of rectangular shape with a midpoint of the other longer side of the magnet and two straight lines formed by connecting both ends of the one longer side of the magnet with two intermediate points on the other longer side, the two intermediate points being positioned closer to the ends of the other longer side than the midpoint of the other longer side. With those arrangements, the force for moving the lens holder in the focus direction and the tracking direction can be produced appropriately.

The lens driving apparatus according to another feature may include a pair of the magnets disposed corresponding with each other, and a pair of the coil substrates disposed facing each of the magnets. In this case, the lens holder can be moved stably according to the pair of the magnets and the coil substrate.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

Figure 1A:
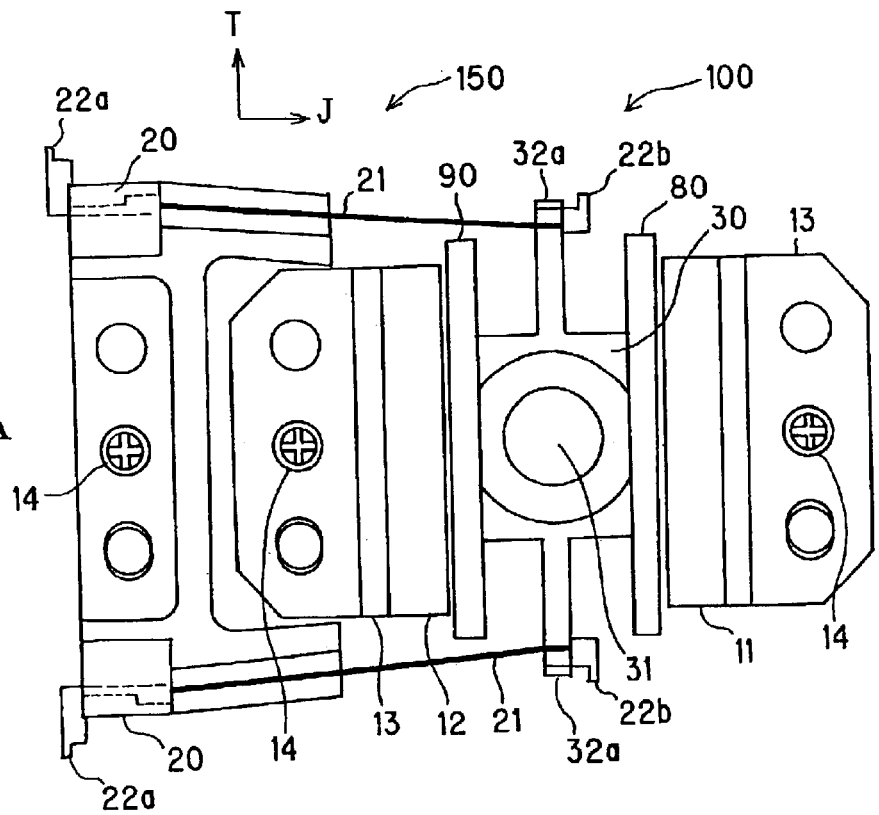
FIGS. 1A and 1B are diagrams showing the structure of a lens driving apparatus according to an embodiment of the present invention.
Figure 1B:
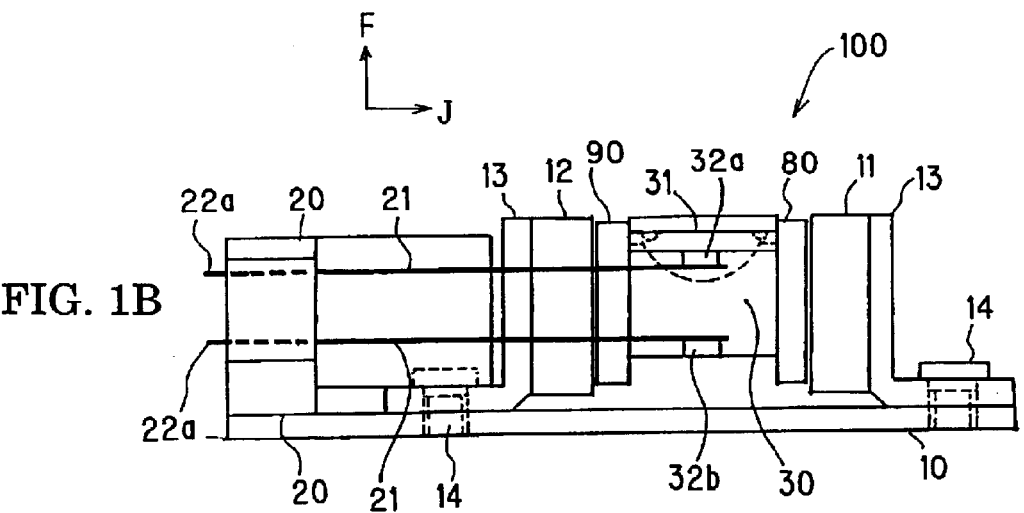
Figure 2:
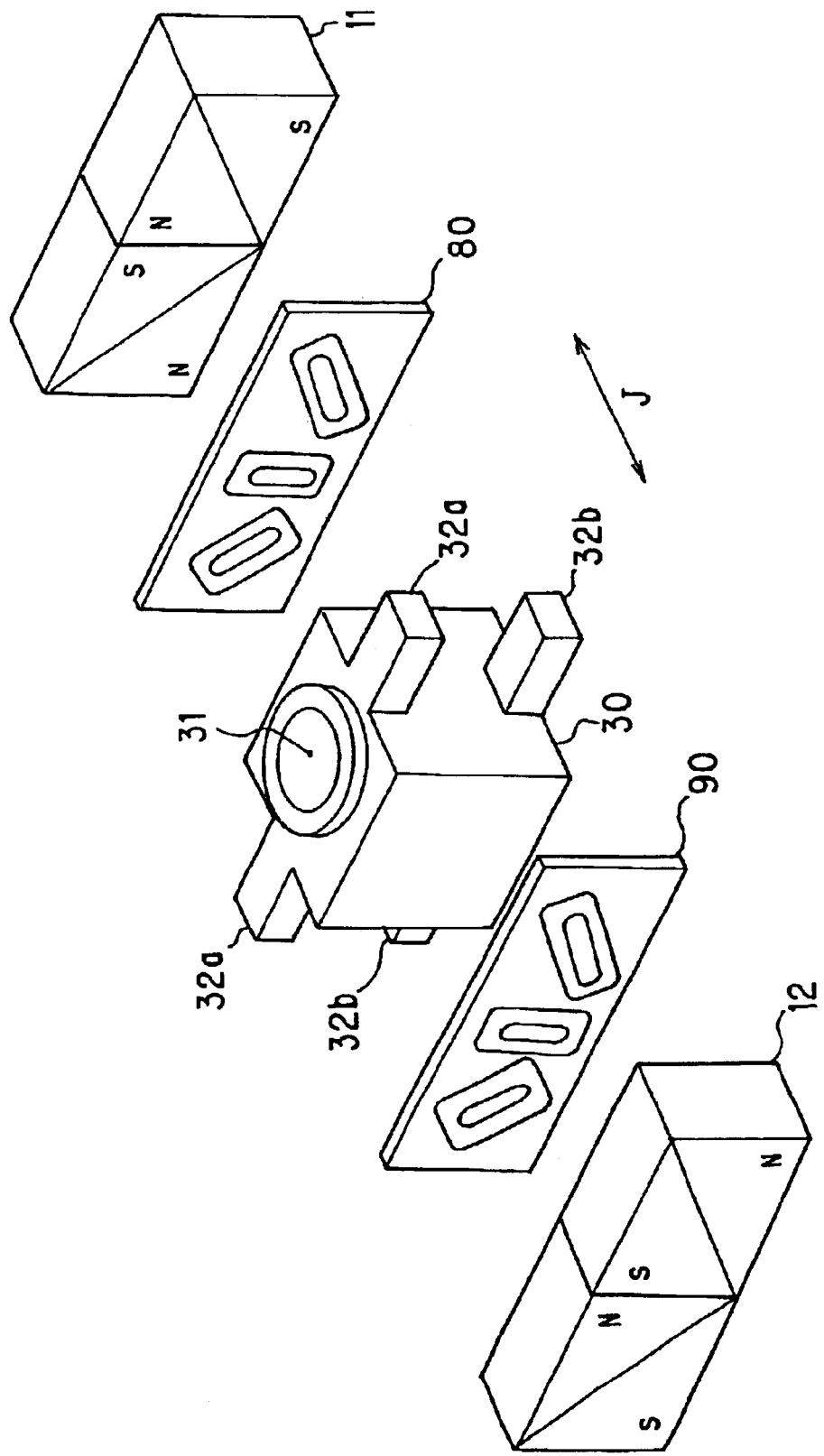
FIG. 2 is an exploded perspective view of the essential part of the lens driving apparatus shown in FIGS. 1A and 1B.

FIGS. 1A and 1B show the configuration of a lens driving apparatus 150 according to an embodiment of the present invention. FIG. 1A is a plan view of the lens driving apparatus, and FIG. 1B is a side view of the same. FIG. 2 is a perspective view schematically showing the positional relationship of magnets 11 and 12, and coil substrate 80 and 90, which constitute, in combination, the lens driving apparatus 150 according to the embodiment of the present invention. Hereafter, with reference to FIGS. 1A to 2B, the configuration of the lens driving apparatus 150 will be described.

In the lens driving apparatus 150 of the embodiment of the present invention, a pair of L-shaped yokes 13 are fixed on a plate-like actuator base 10 by a plurality of screws 14. Magnets 11 and 12 for magnetic field formation are fixed to the L-shaped yokes 13, and the L-shaped yokes 13 are disposed on the actuator base 10 facing with each other with a predetermined magnetic gap provided therebetween. Moreover, a supporting base 20 is fixed on the actuator base 10 by a screw 14, and four supporting wires 21 fixed to the supporting base 20 support a movable part 100 movably in the up and down direction and the right and left direction between the magnets 11 and 12.

The movable part 100 has a substantially square shaped lens holder 30 holding an objective lens 31 in its inside, a coil substrate 80 fixed on the side surface of the lens holder 30 in the jitter direction (arrow J in FIG. 1A) facing the magnet 11 by an adhesive or the like, and a coil substrate 90 fixed on the side surface of the lens holder 30 in the jitter direction facing the magnet 12 by an adhesive or the like. Four supporting parts 32a, 32b formed projecting in the tracking direction (arrow T in FIG. 1A) of the lens holder 30 are supported by the four supporting wires 21. Thereby, the movable part 100 is supported movably in the focus (arrow F in FIG. 1B) direction and the tracking direction.

The supporting wire 21 is made of a conductive bar-like or plate-like elastic member, one end of which is rolled and enlarged so as to provide an outlet part 22a. A part of the supporting wire 21 molded integrally by the outsert molding or the like, at the time of molding the supporting base 20. The other end of the supporting wire 21 is rolled and enlarged so as to provide a connection part 22b in the same manner, and fixed to the four supporting parts 32a, 32b formed on the lens holder 30 by an adhesive or the like.

Figure 4A:
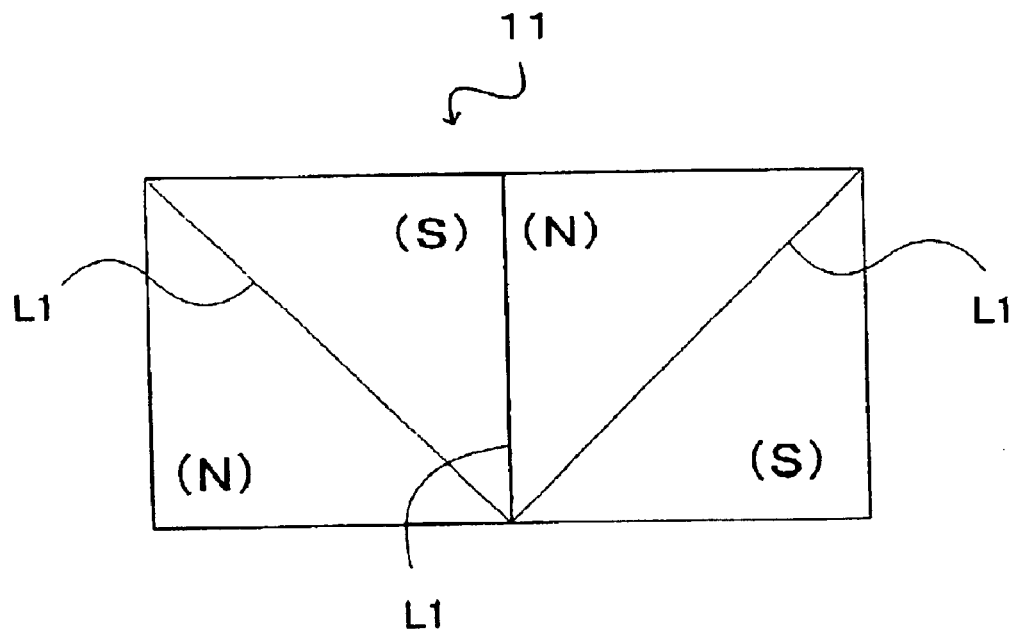
FIGS. 4A and 4B are plan views of a magnet used in the lens driving apparatus shown in FIGS. 1A and 1B.
Figure 4B:
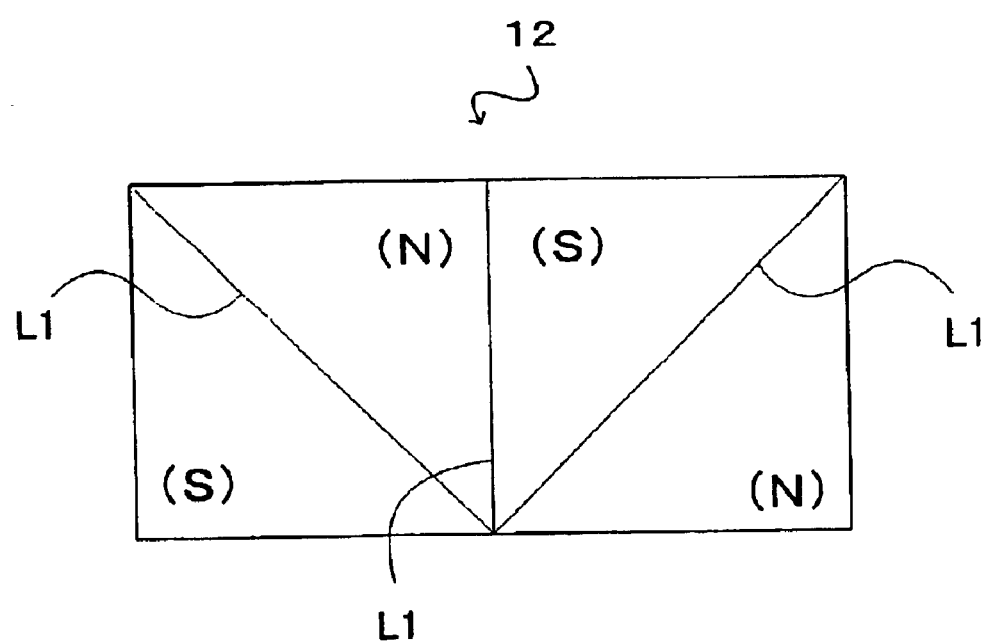

As shown in FIG. 2, the magnets 11 and 12 are formed by combining, for example, the N pole surface and the S pole surface of four magnets having a right angled triangular flat shape. FIG. 4A is a plan view of the magnet 11, and FIG. 4B is a plan view of the magnet 12. As shown in the figures, the magnets 11 and 12 are formed by coupling the right angled triangular magnets of the substantially same shape with the N pole surface and the S pole surface adjacent with each other. As a result, the boundary lines of the magnets form the magnetization boundary lines L1.

As shown in FIGS. 1A and 1B, by disposing the magnets 11 and 12 facing with each other with a predetermined interval provided therebetween, a magnetic field is formed between the magnets 11 and 12. By supplying the current to the focus coils and the tracking coil on the coil substrates 80 and 90 fixed to the lens holder 30 within the magnetic field, the movable part 100 is moved in the focus direction and the tracking direction.

Figure 3:
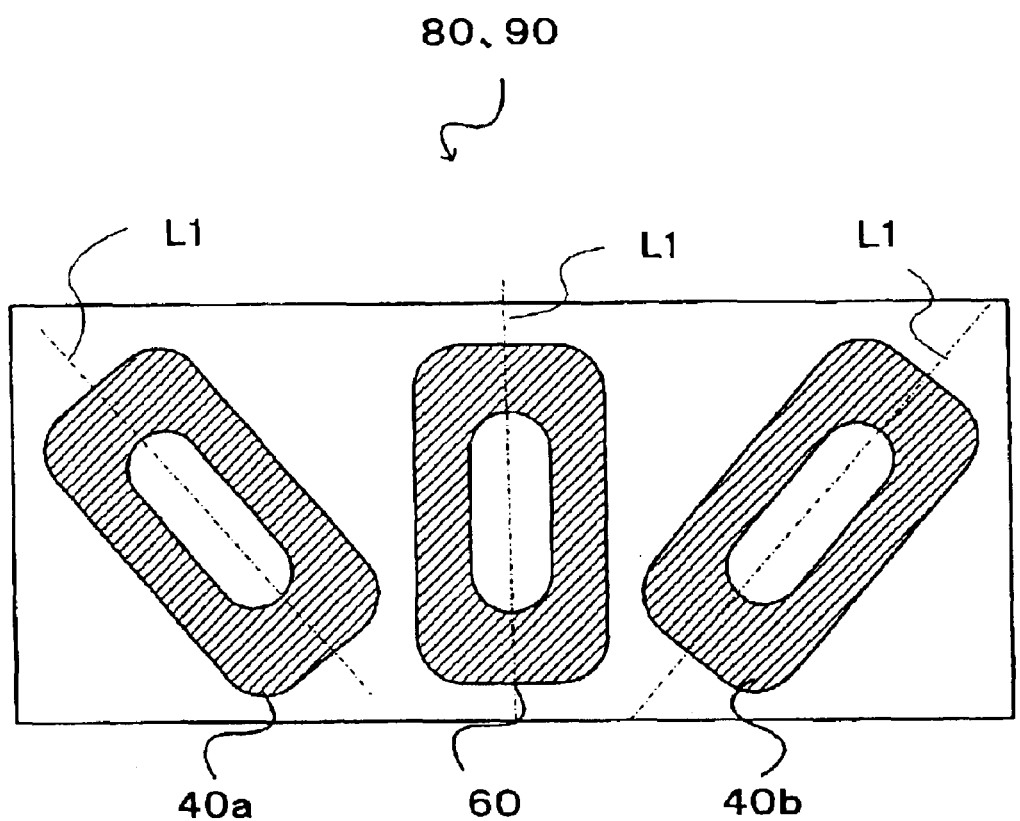
FIG. 3 is a plan view schematically showing the configuration of a coil substrate used in the lens driving apparatus shown in FIGS. 1A and 1B.

FIG. 3 is a plan view of the coil substrates 80 and 90. As shown in FIG. 3, each of the coil substrates 80 and 90 includes a pair of focus coils 40a and 40b and a tracking coil 60. The coil substrates 80 and 90 include, for example, a laminated printed substrate of a glass epoxy material, with the focus coils 40a, 40b and the tracking coil 60 formed on the both sides with the same shape.

According to the present invention, as shown in FIG. 3, the tracking coil 60 is disposed in the space between the pair of the focus coils 40a and 40b. More specifically, the tracking coil 60 is formed vertically longitudinally in the up and down direction of the coil substrate 80 or 90, and the focus coils 40a and 40b are formed on the both sides of the tracking coil 60 such that the longitudinal direction of the focus coils 40a and 40b are inclined with respect to the longitudinal direction of the tracking coil 60. That is, the tracking coil 60 is disposed to straddle the magnetization boundary line L1 at the center of the magnets 11 and 12 shown in FIGS. 4A and 4B. The focus coils 40a and 40b are disposed to straddle the magnetization boundary lines L1 on the right and left sides of the magnets shown in FIGS. 4A and 4B, respectively. Here, "the coil is disposed to straddle the magnetization boundary line" means, not only the case that the magnetization boundary line L1 lies on the center in the width direction of the coil, but also the case that the magnetization boundary line L1 lies on a position slightly displaced from the center of the coil. In other words, as long as the magnetization boundary line L1 lies in the coil central area (area not wound around by the coil), it does not necessarily lie on the center of the coil. This is because the lens holder driving force can be obtained appropriately by the electric current supplied to the coil and the magnetic field defined by the magnetization boundary line if only the coil is divided into two areas in the substantially symmetrical state by the magnetization boundary line, even in the case the magnetization boundary line does not necessarily lie on the center of the coil.

According to this arrangement, since the tracking coil 60 is arranged substantially within the range of the length of the pair of the focus coils 40a and 40b in the vertical direction (i.e., the direction of the shorter side of the coil substrate 80 or 90), the length of the entire coil substrate in the vertical direction can be made smaller. Thereby, compared with the case of disposing the focus coils and the tracking coil displaced from each other in the coil substrate in the vertical direction, the length of the coil substrate in the vertical direction can be remarkably reduced. Moreover, since the coils can be formed along the substantially entirety of the length of the coil substrate in the vertical direction, the size of the coils can be made larger. As a result, the sensitivity can be made higher by enlarging the flux linkage of the coils, and the use efficiency as the magnetic circuit can be improved.

Furthermore, since the focus coils and the tracking coil are formed individually, compared with the case of providing the focus coils and the tracking coil commonly, the need of the switching control can be eliminated and the control system can be simplified.

According to the above mentioned magnetic circuit having the magnets 11 and 12, since the magnetization boundary lines for the focus coils are provided on the both sides of the magnetization boundary line for the tracking coil and the magnetization boundary lines for the focus coils are inclined with respect to the magnetization boundary line for the tracking coil, the height of the magnetic circuit can be made smaller. In general, if the tracking coils are disposed on the both sides of the focus coil, the magnetic circuit requires a substantially U-shaped magnetic boundary line including the magnetic boundary line for the focus coil extending in the horizontal direction and a pair of the magnetization boundary lines for the tracking coils extending in the vertical direction. Therefore, it is difficult to reduce the size of the magnetic circuit in the height direction. In contrast, according to the present invention, a pair of the focus coils are positioned on the both sides of the tracking coil, and as shown in FIGS. 4A and 4B, the magnetic circuit is formed such that the magnetization boundary line for the tracking coil extends in the vertical direction and the magnetization boundary lines for the focus coils extends obliquely (that is, not orthogonal) with respect to the magnetization boundary line for the tracking coil. Thereby, at the time of disposing the tracking coil and the focus coils with respect to each magnetization boundary line, their positions in the height direction need not be displaced drastically. That is, the tracking coil and the focus coils can be disposed correctly with respect to the magnetization boundary lines by disposing them at the substantially same position or at positions slightly displaced with each other in the height direction. Therefore, not only the size of the coil substrate, but the size of the magnet can be miniaturized.

Figure 5A:
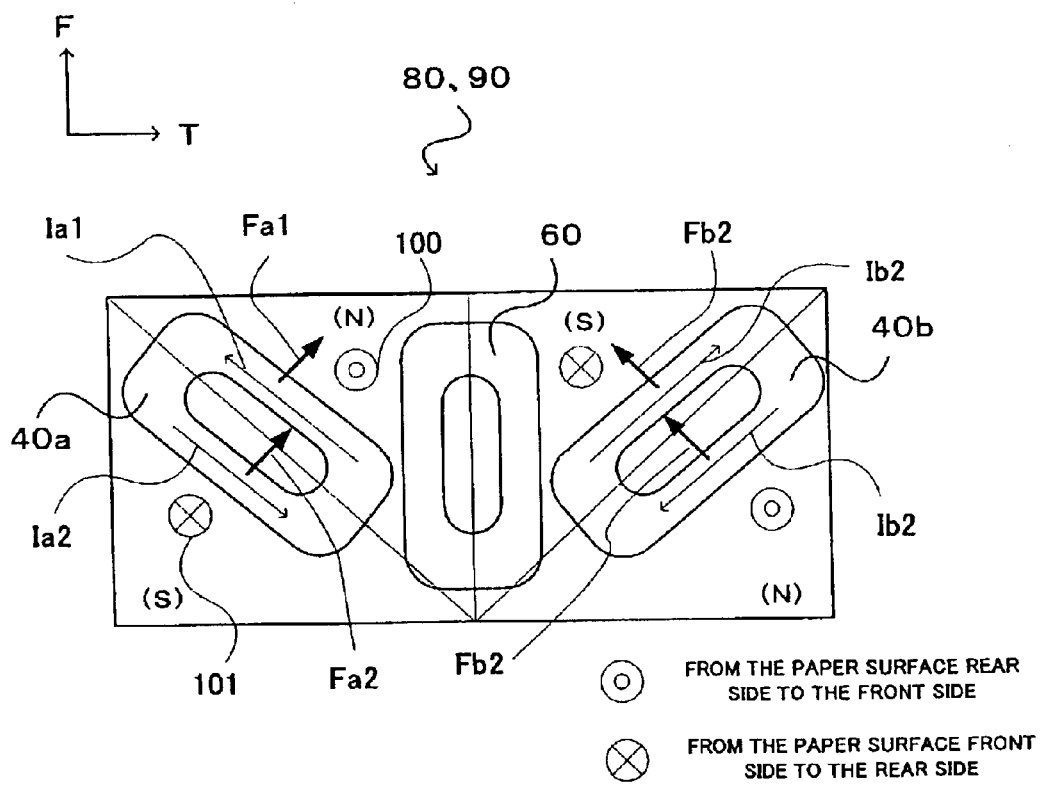
FIGS. 5A and 5B are diagrams showing the operation of focus coils and a tracking coil in the focus control and the tracking control.
Figure 5B:
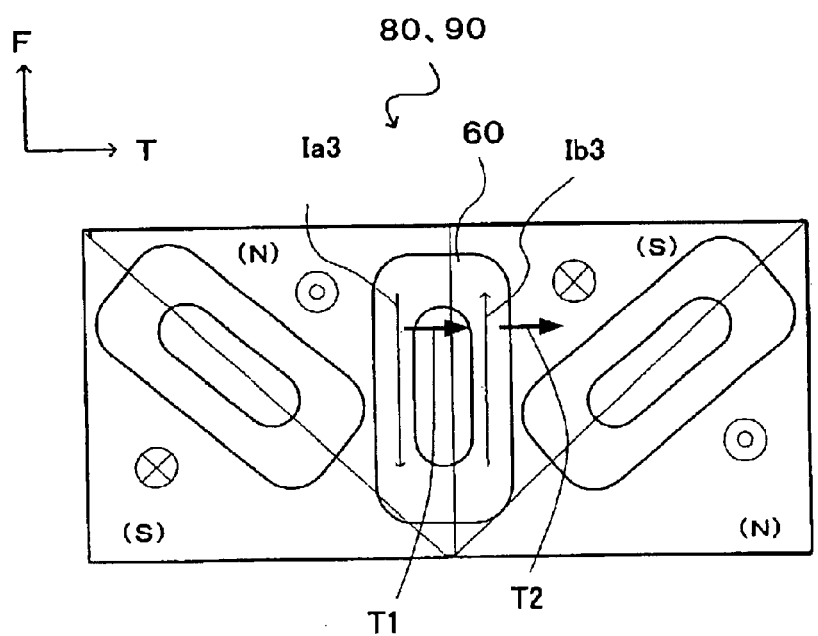

Next, the operation of the lens driving apparatus according to the present invention at the time of the focus control and the tracking control will be described with reference to FIGS. 5A and 5B. First, the focus control will be described with reference to FIG. 5A. FIG. 5A is a diagram schematically showing the operation at the time of the focus control, and shows the positional relationship among the magnet 11 or 12 and the coil substrate 80 or 90. The numerals 100 and 101 in the figure show the magnetic flux direction in each of the four areas of the magnet. The numeral 100 denotes that the magnetic flux is oriented from the rear surface side of the paper toward the front surface side thereof, and the numeral 101 denotes that the magnetic flux is oriented from the front surface side of the paper toward the rear surface side thereof.

In FIG. 5A, when the electric current is supplied to the focus coil 40a in the directions of the arrows Ia1 and Ia2, according to the electric current and the magnetic flux directions shown by the numerals 100 and 101, the forces Fa1 and Fa2 are generated. Similarly, when the electric current is supplied to the other focus coil 40b in the directions of the arrows Ib1 and Ib2, according to the electric current and the magnetic flux directions, the forces Fb1 and Fb2 are generated. Since the focus coils 40a and 40b have the same size and turns (number of winding) and the same magnetic flux interlinks the focus coils 40a and 40b, the tracking direction components (i.e., the horizontal direction components in FIG. 5A) of the forces Fa1, Fa2, Fb1 and Fb2 cancel out with each other, and the total force in the tracking direction becomes zero. Therefore, the movable part 100 is moved in the upper direction of FIG. 5A (i.e., the direction approaching to the disc) by the total sum of the focus direction component (i.e., the vertical direction components) of the forces Fa1, Fa2, Fb1 and Fb2. On the other hand, by inverting the polarity of the electric current supplied to the focus coils 40a and 40b, the direction of the electric currents flowing in the focus coils 40a and 40b become opposite. As a result, the movable part 100 is moved in the lower direction of FIG. 5A (i.e., direction moving away from the disc). Therefore, by changing the polarity and the size of the control electric current supplied to the focus coils 40a and 40b, the movable part 100 can be moved in the focus direction.

Next, the tracking control will be described with reference to FIG. 5B. In FIG. 5B, the magnetic flux directions produced by each area of the magnets 11 or 12 are the same as the case of FIG. 5A. When the electric current is supplied to the tracking coil 60 in the directions of the arrows Ia3 and Ib3, the forces T1 and T2 are generated. Thereby, the movable part 100 is moved in the tracking direction (i.e., the rightward direction in FIG. 5B). In contrast, by inverting the polarity of the electric current supplied to the tracking coil 60, the force is generated in the opposite direction (i.e., the leftward direction in FIG. 5B). Therefore, by changing the polarity and the size of the electric current supplied to the tracking coil 60, the movable part 100 can be moved in the tracking direction.

As mentioned above, according to the lens driving apparatus of the present invention, since the driving control can be executed independently for the focus coils 40a and 40b and the tracking coil 60, compared with the case of providing the focus coils and the tracking coil commonly, the focus control and the tracking control can be simplified.

[Modification of Magnet]

Figure 6A:
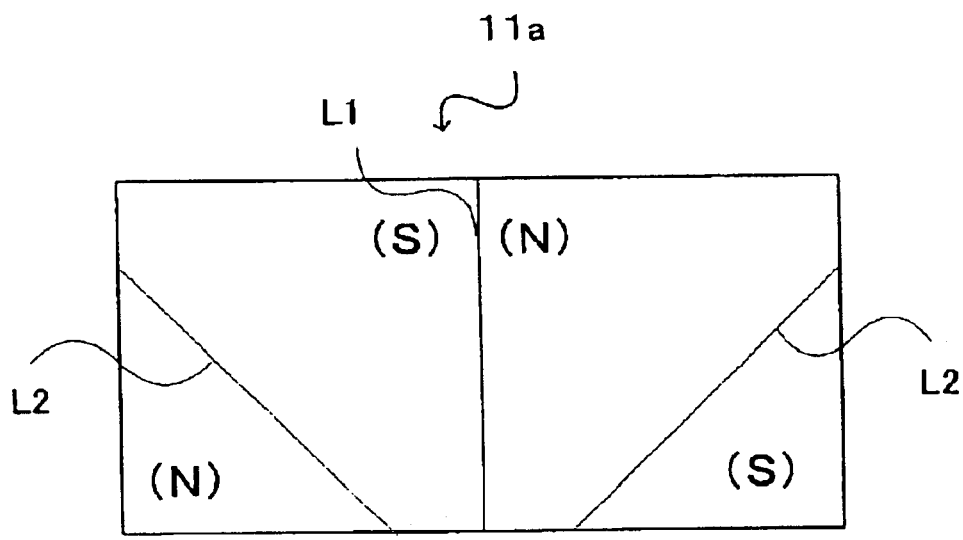
FIGS. 6A and 6B are plan views showing a modified embodiment of a magnet used in the lens driving apparatus shown in FIGS. 1A and 1B.
Figure 6B:
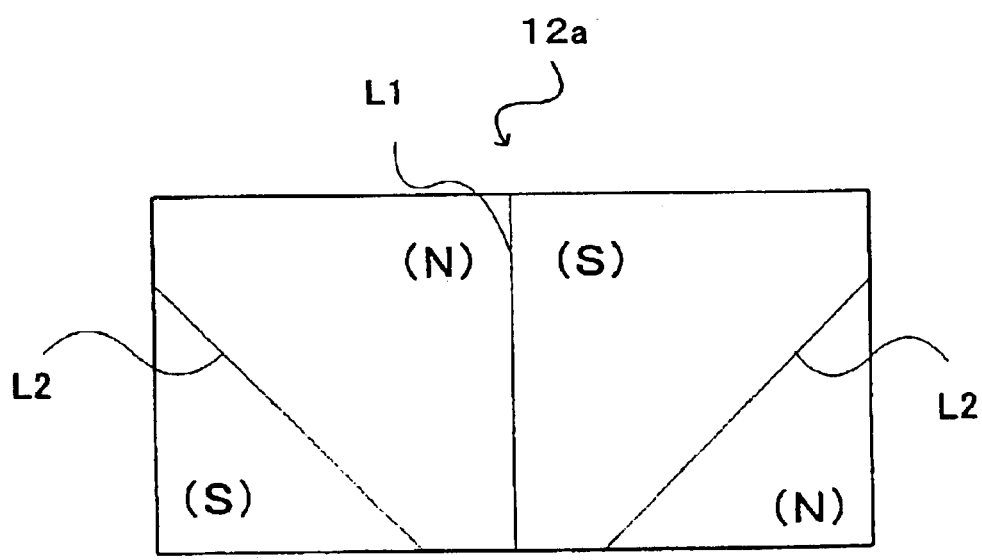

Next, a modified embodiment of the magnet will be described. FIGS. 6A and 6B show the modified embodiments 11a and 12a of the magnets 11 and 12. As is understood by the comparison with the magnets 11 and 12 shown in FIGS. 4A and 4B, the magnets 11a and 12a shown in FIGS. 6A and 6B have the right and left magnetization boundary lines L2 shifted downward. This is for preventing the malfunction of the control resulting from that the focus coil or the tracking coil enters the opposite magnetic field when the coil substrate is moved by the focus control or the tracking control. That is, the magnetization boundary lines L2 are arranged at such positions that the focus coil does not enter the opposite magnetic field area beyond the magnetization boundary line in the case the entire coil substrate is moved downward by the focus control or in the case the entire coil substrate is moved in the tracking direction by the tracking control. The shift amount of the magnetization boundary lines L2 can be determined with reference to the movable range of the focus coil in the focus control or the tracking control. That is, the magnet is configured such that the focus coils do not enter the opposite magnetic field area beyond the magnetization boundary line L2 even when the focus coil is moved by the maximum moving amount according to the movement of the coil substrate.

The magnets shown in FIGS. 4 and 6 can be produced by integrating the individual magnets having a right angled triangular shape with the N pole surface and the S pole surface provided adjacently and alternately, or they can also be produced by magnetizing a magnetic substance by a magnetization device. In the case the magnets are produced by magnetizing a magnetic substance by the magnetization device, it is difficult to accurately form the area with the magnetization boundary lines concentrated as the bottom central part of the magnets 11 and 12 shown in FIGS. 4A and 4B. In this respect, since the magnets 11a and 12a shown in FIGS. 6A and 6B do not have the portion at which the magnetization boundary lines are concentrated, they can be produced relatively easily by magnetizing a magnetic substance by the magnetization device.

[Modification of Coil Substrate]

Figure 7A:
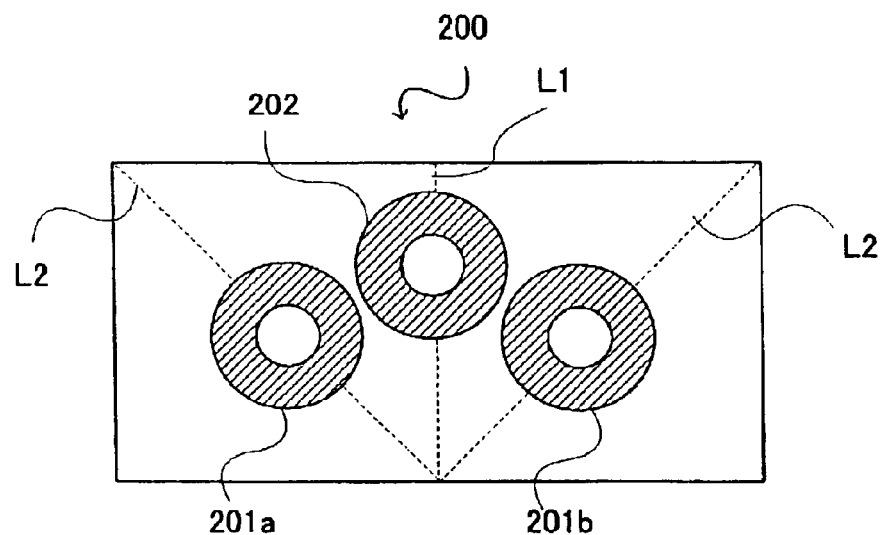
FIGS. 7A and 7B are plan views schematically showing the configuration of another coil substrate used in the lens driving apparatus shown in FIGS. 1A and 1B.
Figure 7B:
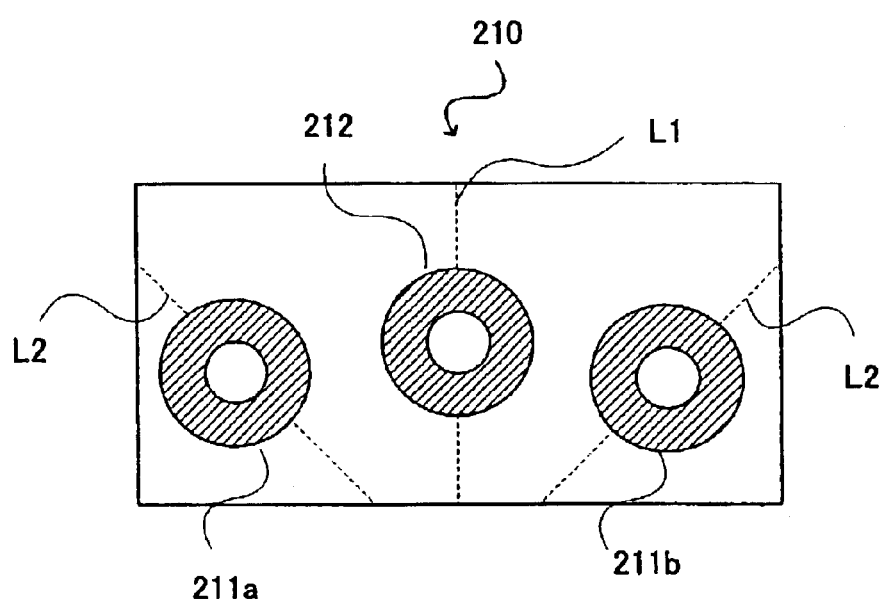

FIGS. 7A and 7B show modified embodiments of the coil substrate. These coil substrates utilize a circular coil instead of a substantially rectangular one. Namely, the coil substrate 200 of FIG. 7A includes the focus coils 201a and 201b, and a tracking coil 202. The coil substrate 210 of FIG. 7B includes the focus coils 211a and 211b, and a tracking coil 212. It is noted that FIG. 7A shows a coil substrate to be used with the magnets shown in FIGS. 4A and 4B, and FIG. 7B shows a coil substrate to be used with the magnets shown in FIGS. 6A and 6B.

Figure 8A:
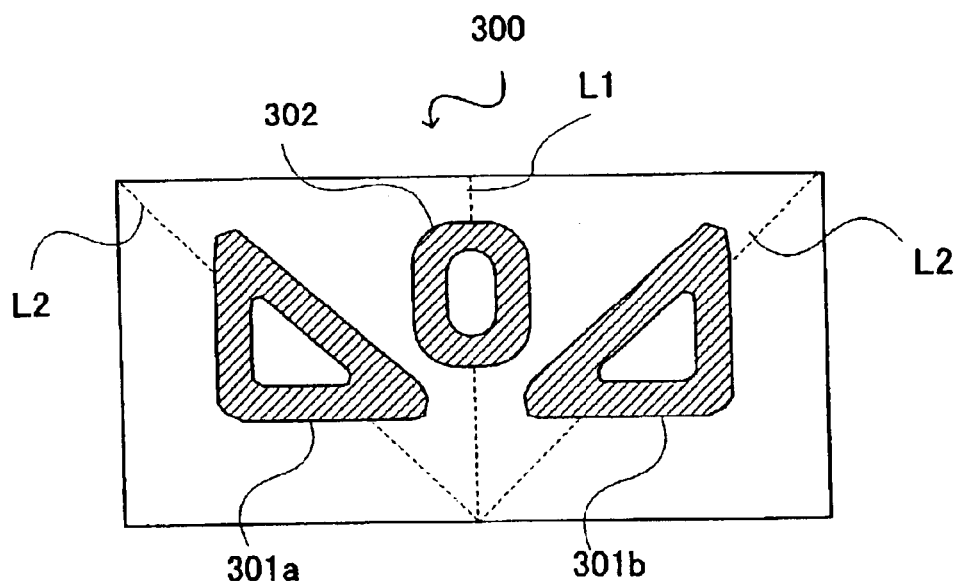
FIGS. 8A and 8B are plan views schematically showing the configuration of a still another coil substrate used in the lens driving apparatus shown in FIGS. 1A and 1B.
Figure 8B:
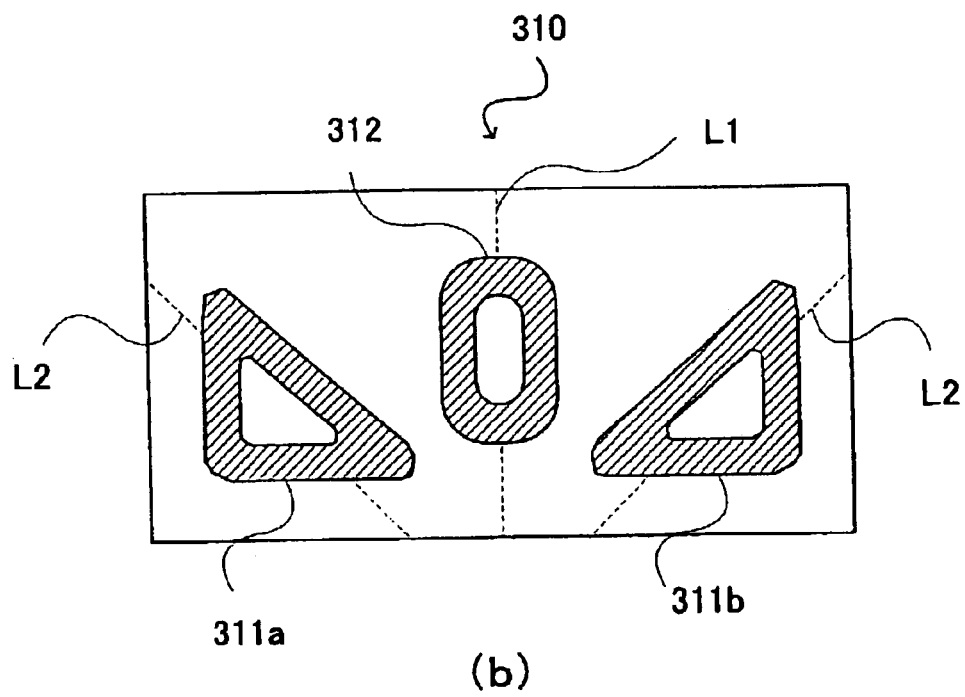

FIGS. 8A and 8B show other modified embodiments of the coil substrate. These coil substrates utilize a triangular coil instead of a substantially rectangular one. Namely, the coil substrate 300 of FIG. 3A includes the focus coils 301a and 301b, and a tracking coil 302. The coil substrate 310 of FIG. 8B includes the focus coils 311a and 311b, and a tracking coil 312. It is noted that, FIG. 8A shows a coil substrate to be used with the magnets shown in FIGS. 4A and 4B, and FIG. 8B shows a coil substrate to be used with the magnets shown in FIGS. 6A and 6B.

As described above, the shapes of the tracking coil and the focus coil are not limited to the substantially rectangular one, and they may be circular, or the like. That is, as long as the gap of the coil of the triangular shape, the substantially rectangular shape, the circular shape, or the like, is disposed to straddle the magnetization boundary lines formed by the magnets, such a coil can function as the focus coil and the tracking coil.

Moreover, as shown in FIGS. 7A, 7B, 8A and 8B, even in the case the positions of the tracking coil and the focus coils in the height direction of the coil substrate are slightly displaced, by disposing the focus coils on the both sides of the tracking coil, the effect of reducing the height of the magnetic circuit can be obtained. Actually, compared with the case of having the magnetization boundary line for the tracking coil and the magnetization boundary line for the focus coil provided orthogonal with each other, the displacement is extremely small. Therefore, according to the structure of the present invention in which the focus coils are disposed on the both sides of the tracking coil, even in the case the three coils are not precisely aligned in the longitudinal direction of the coil substrate, but are displaced slightly in the height direction, the effect of miniaturizing the magnetic circuit and the coil substrate can be obtained.

As described above, according to the coil substrate of the present invention, a pair of the focus coils are disposed on the both sides of the tracking coil in the longer side direction thereof such that they can be arranged in the substantially same height, or substantially aligned in the longer side direction. Moreover, the magnetization boundary lines corresponding to the focus coils are oblique with respect to the magnetization boundary line corresponding to the tracking coil. Thereby, the size of the magnetic circuit including the magnet and the coil substrate can be made smaller, and the lens driving apparatus itself can be made smaller as well.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2002-152054 filed on May 27, 2002 including the specification, claims, drawings and summary is incorporated herein by reference in its entirety.

What is claimed is:

1. A coil substrate for a lens driving apparatus comprising:

a substrate of substantially rectangular shape;

a tracking coil disposed on the substrate; and a pair of focus coils disposed on both sides of the tracking coil in a direction of a longer side of the substrate;

wherein the tracking coil and the focus coils have a substantially equal length in a direction of a shorter side of the substrate.

2. The coil substrate for a lens driving apparatus according to claim 1, wherein the tracking coil and the focus coils are substantially aligned in the direction of the longer side of the substrate.

3. A lens driving apparatus comprising:

a base;

a magnet fixed on the base;

a lens holder supported in a state movable in a focus direction and a tracking direction in a vicinity of the magnet; and a coil substrate mounted on the lens holder, wherein the coil substrate comprises:

a tracking coil disposed on the substrate, and a pair of focus coils disposed on the substrate on both sides of the tracking coil in a direction of a longer side of the substrate;

wherein the tracking coil and the focus coils have a substantially equal length in a direction of a shorter side of the substrate.

4. The lens driving apparatus according to claim 3, wherein the tracking coil and the focus coils are substantially aligned in the direction of the longer side of the substrate.

5. The lens driving apparatus according to claim 3, wherein the magnet has a plurality of magnetization boundary lines formed by an S pole area and an N pole area adjacent with each other, and wherein the magnetization boundary lines corresponding to the focus coils are inclined with respect to the magnetization boundary line corresponding to the tracking coil.

6. The lens driving apparatus according to claim 3, wherein the magnet has a plurality of magnetization boundary lines formed by an S pole area and an N pole area adjacent with each other, and wherein the coil substrate is disposed at such a position that each of the tracking coil and the focus coils straddles the corresponding magnetization boundary lines.

7. The lens driving apparatus according to claim 3, wherein the magnet has three magnetization boundary lines formed by an S pole area and an N pole area adjacent with each other, and wherein the three magnetization boundary lines coincide with three straight lines formed by connecting a midpoint of one longer side of the magnet of rectangular shape with both ends and a midpoint of the other longer side of the magnet.

8. The lens driving apparatus according to claim 3, wherein the magnet has a plurality of magnetization boundary lines formed by an S pole area and an N pole area adjacent with each other, and wherein the a plurality of magnetization boundary lines coincide with three straight lines, the three straight lines including one straight line formed by connecting a midpoint of one longer side of the magnet of rectangular shape with a midpoint of the other longer side of the magnet and two straight lines formed by connecting both ends of the one longer side of the magnet with two intermediate points on the other longer side, the two intermediate points being positioned closer to the ends of the other longer side than the midpoint of the other longer side.

9. The lens driving apparatus according to claim 3, comprising a pair of the magnets disposed corresponding with each other, and a pair of the coil substrates disposed facing each of the magnets.

* * * * *